Sept. 29, 1964
R. P. LYNN
3,150,933
APPARATUS FOR PRODUCING CARBON BLACK
Filed Dec. 22, 1961
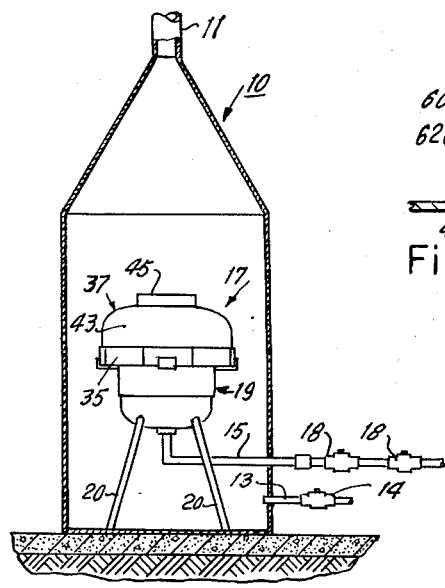
Fig. 1
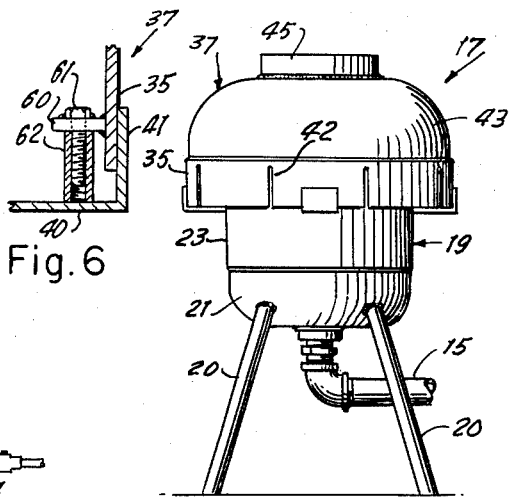
Fig. 6
Fig. 2
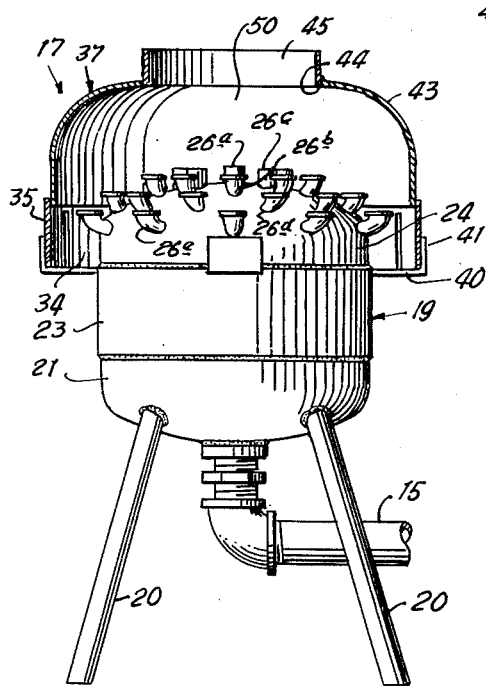
Fig. 4
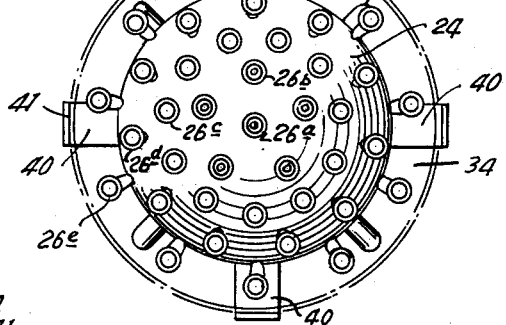
Fig. 3
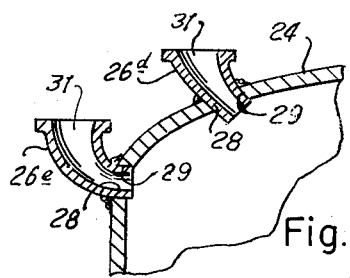
Fig. 5
INVENTOR
Rice P. Lynn
BY *Hastings Ackley and Walter J. Jagr*
ATTORNEYS

3,150,933
APPARATUS FOR PRODUCING CARBON BLACK
Rice P. Lynn, 2009 Shamrock, San Angelo, Tex.
Filed Dec. 22, 1961, Ser. No. 161,672
8 Claims. (Cl. 23—259.5)

This invention relates to apparatus for producing carbon black.

An object of this invention is to provide a new and improved apparatus for producing carbon black by incomplete combustion of gaseous hydrocarbons, natural gas, for example.

Another object is to provide an apparatus for producing carbon black having a burner in which the gases which are to be subjected to partial combustion or thermal decomposition are preheated in the burner prior to their exposure to a combustion supporting gas.

Still another object is to provide an apparatus for producing carbon black having a burner wherein the gaseous hydrocarbons and the combustion supporting gas are caused to swirl or spiral so that its products of partial combustion and thermal decomposition are caused to swirl or spiral into contact with a hood to effect production of carbon black.

A further object is to provide an apparatus for manufacturing carbon black having a substantially circular hollow burner vessel provided with an arcuate domed top having a plurality of outlet tips or nozzles communicating with the interior of the vessel, the upper ends of the passages of the nozzle being spaced from the domed top of the burner outlet whereby oxygen bearing gases may flow about and upwardly around the nozzles and ends of the nozzles as well as over the outlets thereof.

A still further object is to provide an apparatus for producing carbon black, of the type described, wherein a substantially circular hood is disposed in spaced relationship over the domed upper portion of the burner vessel and in spaced relationship to the outlet nozzles to provide an annular passage through which the oxygen bearing gases may flow upwardly to mix with the gaseous hydrocarbon being discharged through the outlet nozzles to cause a swirling or spiral movement of the oxygen bearing gases, the gaseous hydrocarbons and the products of the partial combustion or thermal decomposition of the hydrocarbons and the engagement of such gases with the inner surfaces of the hood which acts as a contact catalyst to cause decomposition of the partially combusted hydrocarbons into carbon black.

Another object is to provide an apparatus producing carbon black wherein the gaseous hydrocarbons move at a low velocity out of the upper ends of the passages of the outlet nozzles due to outward flowing of the passages.

A still further object is to provide an apparatus for producing carbon black which includes a furnace having an outlet duct and a burner disposed in the lower portions of the furnace having a vessel into which gaseous hydrocarbons under pressure are introduced to escape therefrom through outlet nozzles having upwardly facing and outwardly tapered outlet passages which open into an arcuate circular chamber formed by a hood disposed above the outlet nozzles and extending therebelow whereby oxygen bearing gas introduced into the lower portion of the furnace below the hood may flow upwardly through the arcuate annular chamber to mix with the gaseous hydrocarbons being discharged by the outlet nozzles from the burner vessel to cause partial combustion and thermal decomposition of the gaseous hydrocarbons and simultaneous swirling flow of the various gasses in the arcuate annular chamber whereby the products of the partial decomposition of the gaseous hydrocarbons are brought into contact with the inner surfaces of the hood which act as a contact catalyst to cause cracking of such hydrocarbons to produce carbon black.

A still further object is to provide a device for the manufacture of carbon black wherein the temperature within the furnace is maintained at a relatively low value and below 2000 degrees Fahrenheit.

Additional objects and advantages of the invention will be readily apparent from the reading of the following description of a device constructed in accordance with the invention, and reference to the accompanying drawings thereof, wherein:

FIGURE 1 is a vertical, partly sectional view of the apparatus for producing carbon black embodying the invention;

FIGURE 2 is a side view of the apparatus disclosed in FIGURE 1;

FIGURE 3 is a top view of the burner shown in FIGURE 2 with the hood removed;

FIGURE 4 is a side view of the burner with the hood shown in section;

FIGURE 5 is a partly sectional view of the upper portion of the burner showing the upwardly and outwardly tapered outlets of the outlet nozzles; and FIGURE 6 is a fragmentary sectional view of an adjustable means for supporting the hood on the burner vessel.

The apparatus for producing carbon black embodying the invention includes a furnace 10 having a discharge conduit 11 at its top which may be connected to suitable fans or suction blowers for removing gases and carbon black suspended floating in such gases from the interior of the furnace. The furnace may be provided with a suitable access door. An air line 13 provided with a suitable regulator valve 14 opens into the furnace at its lower end to provide a means by which gases bearing oxygen may be introduced into the furnace. A gas line 15 also extends into the furnace to supply gaseous hydrocarbons to the burner 17 disposed in the furnace. Suitable regulator valves 18 are provided in the line 15 to regulate the rate of flow of the gaseous hydrocarbons to the burner 17.

The burner 17 includes a vessel 19 mounted on four legs 20 which extend annularly outwardly from the bottom portion 21 of the vessel. The arcuate bottom portion 21 of the vessel is connected by an intermediate cylindrical portion 23 to a circular domed or arcuate top portion 24. These portions of the members of the vessel are secured to one another in airtight relationship in any suitable manner, as by welding. The top portion 24 of the burner is provided with a plurality of outlet tips or nozzles 26 whose lower reduced portions 28 extend into suitable apertures or bores 29 in the top portion and are secured to the domed portion by any suitable means, as by welding. The outlet nozzles have outlet passages 31 which taper upwardly and outwardly so that the uppermost discharge portions of the nozzle are of greater diameter than the lowermost portions thereof. As a result, the gas moving upwardly through the passages 31 from the interior of the vessel 18 loses velocity as it moves upwardly through the passages 31 and has a very low exit velocity as it leaves the wide upwardly facing discharge ends of the outlet passages 31. The nozzles 26 are all of such configuration that the passages 31 open upwardly therefrom. For example, the central nozzle 26a may be substantially straight in form and the nozzles 26b, 26d and 26e arranged in circles of progressively greater radius are provided with passages which are curved as required due to angular displacement of the nozzles from the vertical caused by the spacing from the central topmost point of the top portion of the vessel and positioning at the arcuate surface of the top portion.

It will be noted, FIGURE 3, that the outlet nozzles are disposed in substantially uniform spaced relationship with the outermost annular row of the nozzles 26e extending outwardly into the annular passage 34 provided between the vessel 19 and the lower annular section or skirt 35 of a hood 37 which is disposed in spaced relationship to the vessel and which is removably supported on the vessel by means of the brackets 40 which extend radially outwardly from the burner and are secured thereto in any suitable manner, as by welding. Each of the brackets has an upwardly extending arm 41 which is disposed to engage the outer surface of the skirt. The skirt may be provided with a plurality of vertical circumferentially spaced slots 42 which may provide passages for the inflow of air into the annular passage 34 as well as to provide room for the expansion and contraction of the skirt with changes in temperature. The hood also has an intermediate section 43 which extends arcuately upwardly and inwardly to a central opening 44 thereof. The discharge duct section of the hood extends upwardly from a central opening of the intermediate arcuate section of the hood and is secured to the intermediate section by any suitable means, such as by welding.

The hood and the upper portion of the vessel define a combustion chamber 50 which opens downwardly into the annular passage 34 and upwardly into the passage of the discharge duct section 45 of the hood which in turn opens upwardly into the furnace.

The gas inlet pipe 15 is connected to the bottom portion 21 of the burner vessel by means of any suitable fitting assembly 52.

In use, the oxygen as a constituent of air is introduced into the furnace through the air inlet pipe 13, at a rate controlled by the regulator valve 14 and simultaneously gaseous hydrocarbons, such as nitrogas, are caused to flow at a rate controlled by the regulator valve 18 into the preheater vessel 19 of the burner 17 and thence outwardly and upwardly through the passages 31 of the nozzles into the combustion chamber 50. The oxygen bearing air flows into the combustion chamber 50 upwardly through the annular passage 34. The air flows not only outwardly and over the outlet nozzles in the chamber 50 but also flows upwardly and over the domed top portion 24 of the burner between the nozzles to provide a thorough mixing of the air with the gaseous hydrocarbons flowing outwardly of the passageways of each of the outlet nozzles and also to provide oxygen for mixture with the gaseous hydrocarbons flowing from every one of the outlet nozzles. This thorough mixing of the gases and provision of an adequate supply of air at each outlet nozzle would not occur were the outlet nozzles 26 omitted and the passages 29 themselves tapered or flared outwardly.

The oxygen thus introduced and mixed with the gaseuos hydrocarbons flowing at low velocity from the outlet nozzles causes partial combustion of the gaseous hydrocarbons and raises the temperature of the gases in the combustion chamber. Since the air flows upwardly through an annular passage 34 into the substantially circular combustion chamber 50, a swirling or spiral movement is induced in the gases flowing through the combustion chamber and toward the discharge duct 45 of the hood. This swirling movement causes the hot gases and products of the partial combustion of the gaseous hydrocarbons to impinge on and contact the inner surfaces of the hood 37 which acts as a contact catalyst to cause the products of the partial combustion of the hydrogen to crack and form in carbon black. The rise in temperature in the chamber caused by this partial combustion of course causes an acceleration of the velocity of flow of gases and of their flow outwardly through the discharge duct 45 of the hood into the upper portion of the furnace from whence the gases and the carbon black which is suspended therein are removed from the furnace through the discharge duct 11 in the usual manner, as by blowers or suction fans.

It will of course be apparent that due to the provision of the burner vessel 19 the gaseous hydrocarbons, prior to their being discharged through the passageways 31 of the outlet nozzles, are preheated in the vessel since they remain an appreciable time in the vessel due to its relatively large capacity and since the temperature within the furnace is of course elevated due to the release of heat from the partial combustion of the gaseous hydrocarbons. The hydrocarbons flowing into the combustion chamber are of course initially ignited in any suitable manner, as by a flame introduced into the combustion chamber, access to the burner for this purpose being had through the access door.

It will now be seen that the apparatus for producing carbon black includes a furnace 10 having a discharge duct 11 at its upper end through which the products of the partial combustion of hydrogens and oxygen are removed from the furnace, a burner 17 disposed in the furnace and provided with hydrocarbons by means of an inlet pipe 15 which extends into the furnace, and an oxygen inlet pipe 13 adjacent the lower end of the furnace for introducing oxygen into the furnace at a controlled rate to provide for only partial combustion of the hydrocarbons by the burner.

It will further be seen that the burner 19 includes a preheater vessel 19 into which the hydrocarbons are admitted for preheating and that the vessel has a circular domed top portion provided with outlet nozzles 26 which extend outwardly from the top portion and are provided with discharge or outlet passages 31 whose diameter increases outwardly to the outer ends of the nozzles to lower the velocity of the hydrocarbons escaping through the discharge ends of the outlet passages, and that the outer end of the nozzles are spaced from the top portion of the burner vessel to permit an oxygen bearing gas, such as air, to circulate between and about the outlet nozzles below the upper ends thereof so that the stream of gaseous hydrocarbons flowing from each nozzle is provided with oxygen at a rate which provides for the substantially uniform partial combustion of the hydrocarbons flowing from all the nozzles. It is also apparent that if the outlet apertures 29 were merely flared outwardly and not provided with nozzles the streams of hydrocarbons closer to the center of the top of the burner vessel would not be provided with oxygen at as great rates as the streams of hydrocarbons remote from the center, since the combustion of the hydrocarbons of such outer streams would consume a large proportion of the oxygen of the air before the air passed to the streams near the center of the top.

It will further be seen that the burner is provided with a hood which telescopes over the upper portion of the burner vessel to provide with the vessel an annular passage 34 through which air may flow upwardly to the nozzles and into an annular combustion chamber 50 and thence through an outlet section 45 into the upper portion of the furnace, the circular configuration of the burner top portion 24 and of the hood causing swirling and turbulence of the gases in the combustion chamber so that all portions of the gases come into contact with the internal surfaces of the hood, which may be of iron or steel, which act as a contact catalyst to cause the hydrocarbons present in the gases swirling in the chamber 50 to crack and form carbon black.

It will further be seen that the air and the gaseous hydrocarbons are delivered to the furnace at such rates that the hydrocarbons flow into the combustion chamber at low velocity rates and that the air is introduced into the furnace at such rates as to cause only partial combustion of the hydrocarbons in the combustion chamber.

It will also be seen that the outer ends of all nozzles 26 are equally spaced from adjacent outer surfaces of the top portion so that the outer ends of nozzles more remote from the center of the top portion are lower than such outer ends of nozzles nearer the center.

If desired, the vertical relationship of the hood 37 to the top portion of the vessel may be made adjustable by providing the skirt 35 of the hood with inwardly extending lugs to which are rigidly secured, as by welding, bolts 61 which extend into the threaded spacer sleeves 62 whose lower ends rest on the brackets 40. It will be apparent that if the spacer sleeves are rotated in a direction to extend then downwardly on the bolts, the volume of the chamber 50 will be increased and if they are rotated to positions more fully telescoped on the bolts, the volume of the chamber 50 will be decreased. Varying the volume of the chamber results in changes in temperature and turbulence conditions of the gasses moving therethrough and thus provides for a control of the type and grade of carbon black which is produced.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. An apparatus for producing carbon black including: a furnace; a discharge duct at the end portion of said furnace; means for introducing oxygen into the furnace at its lower portion; a burner in said furnace, said burner including a vessel having a circular top portion provided with a plurality of nozzles having passageways communicating with the interior of said vessel; a circular hood disposed about said top portion and providing with said vessel a combustion chamber above said top portion and an annular passage opening upwardly into said combustion chamber and downwardly into the furnace above said means for introducing oxygen into the furnace, said passageways opening upwardly into said combustion chamber at positions spaced from said top portion, said hood having an upwardly opening outlet disposed above said vessel; and means for introducing a gas having hydrocarbons into a lower portion of said vessel.

2. An apparatus for producing carbon black including: a furnace; a discharge duct at the end portion of said furnace; means for introducing oxygen into the furnace at its lower portion; a burner in said furnace, said burner including a vessel having a circular top portion provided with a plurality of nozzles having passageways communicating with the interior of said vessel; a circular hood disposed about said top portion and providing with said vessel a combustion chamber above said top portion and an annular passage opening upwardly into said combustion chamber and downwardly into the furnace above said means for introducing oxygen into the furnace, said passageways opening upwardly into said combustion chamber at locations spaced from said top portion, said passageways increasing upwardly in cross sectional area to reduce the velocity of gas flowing therefrom into said combustion chamber, said hood having an upwardly opening outlet disposed above said vessel; and means for introducing a gas having hydrocarbons into a lower portion of said vessel.

3. An apparatus for producing carbon black including: a furnace; a discharge duct at the upper end portion of said furnace; means for introducing oxygen into the furnace at its lower portion; a burner in said furnace, said burner including a vessel having a top portion provided with a plurality of nozzles having passageways whose upper ends open upwardly in the same direction at positions spaced from said top portion and whose lower ends open into said vessel; hood means disposed about said top portion having a discharge outlet above said top portion and forming with said vessel a combustion chamber disposed above said top portion, and a passageway about the vessel opening upwardly into said chamber and downwardly into said furnace above said means for introducing oxygen, said passageway and said hood means being of such configuration as to induce swirling in the gases flowing through said combustion chamber to said discharge outlet; and means for introducing a gas having hydrocarbons into said vessel.

4. A burner including a vessel having a top portion having a plurality of spaced nozzles extending outwardly of the top portion and having passageways communicating with the interior of said vessel and opening upwardly at positions spaced from the top portion; means for introducing a gas into the vessel; and a hood disposed about the top portion and spaced therefrom to provide with said vessel a combustion chamber above said top portion and a passage about said vessel opening upwardly into said combustion chamber and downwardly to the exterior of said vessel and said hood, said hood having a discharge opening disposed above said top portion.

5. A burner including a vessel having a top portion having a plurality of spaced nozzles extending outwardly of the top portion and having passageways communicating with the interior of said vessel and opening upwardly at positions spaced from the top portion, said passageways increasing in area toward said positions to decrease the velocity of gases flowing therethrough from the interior of the vessel; means for introducing a gas into the vessel; and a hood disposed about the top portion and spaced therefrom to provide with said vessel a combustion chamber above said top portion and a passage about said vessel opening upwardly into said combustion chamber and downwardly to the exterior of said vessel and said hood, said hood having a discharge opening disposed above said top portion.

6. A burner including a vessel having a top portion sloping arcuately downwardly in all directions from a central point, said top portion being provided with a plurality of passageways communicating with the interior of the vessel and opening upwardly at positions spaced from said top portion; means for introducing a gas into the vessel; and a hood disposed about the top portion and spaced therefrom to provide with said vessel a combustion chamber above said top portion and a circular passage about said vessel opening upwardly into said combustion chamber and downwardly to the exterior of said vessel and said hood, said hood having a discharge opening disposed above said top portion.

7. A burner including a vessel having a top portion having a plurality of spaced nozzles extending outwardly of the top portion and having passageways communicating with the interior of said vessel and opening upwardly at positions spaced from the top portion; means for introducing a gas into the vessel; and a hood disposed about the top portion and spaced therefrom to provide with said vessel a combustion chamber above said top portion and a passage about said vessel opening upwardly into said combustion chamber and downwardly to the exterior of said vessel and said hood, said hood having a discharge opening disposed above said top portion, said top portion sloping arcuately downwardly in all directions from a central point.

8. A burner including a vessel having a top portion having a plurality of spaced nozzles extending outwardly of the top portion and having passageways communicating with the interior of said vessel and opening upwardly at positions spaced from the top portion, said top portion sloping arcuately downwardly in all directions from the center thereof, said positions of nozzles more remote from the center of the top portion being lower than said positions of nozzles less remote from said center.

References Cited in the file of this patent
UNITED STATES PATENTS

| 2,547,276 | Marsh et al. | Apr. 3, 1951 |
| 2,992,074 | Balka et al. | July 11, 1961 |

FOREIGN PATENTS

| 537,802 | Canada | Mar. 5, 1957 |